United States Patent [19]

Adam et al.

[11] Patent Number: 4,727,274
[45] Date of Patent: Feb. 23, 1988

[54] COMMUTATOR MOTOR OF A CLOSED DESIGN WITH AN EXTERNAL ELECTRICAL CONNECTOR HOUSING

[75] Inventors: Peter Adam, Hochberg; Werner Seuffert, Bergrheinfeld, both of Fed. Rep. of Germany

[73] Assignee: Siemens Aktiengesellschaft, Munich, Fed. Rep. of Germany

[21] Appl. No.: 905,244

[22] Filed: Sep. 8, 1986

[30] Foreign Application Priority Data

Sep. 30, 1985 [DE] Fed. Rep. of Germany ....... 3534924

[51] Int. Cl.$^4$ .......................................... H02K 11/00
[52] U.S. Cl. ..................... 310/239; 310/45; 310/71; 310/89
[58] Field of Search .............. 310/43, 87, 88, 89, 310/71, 72, 239, 242, 244, 246, 45

[56] References Cited

U.S. PATENT DOCUMENTS 2,590,559  3/1952  Miller ............................. 310/71
4,326,605  5/1982  Angi et al. ...................... 310/68 R
4,546,280 10/1985  Pflüger .......................... 310/239

FOREIGN PATENT DOCUMENTS 959904  12/1974  Canada ............................. 310/239
0043460  1/1982  European Pat. Off. .
175993   4/1986  European Pat. Off. .
2422410 11/1975  Fed. Rep. of Germany .
2739408  3/1979  Fed. Rep. of Germany .
2813956  4/1979  Fed. Rep. of Germany ...... 310/239
2486323  1/1982  France ............................ 310/239
2499328  8/1982  France .
1317424  4/1973  United Kingdom .

Primary Examiner—Patrick R. Salce
Assistant Examiner—D. L. Rebsch
Attorney, Agent, or Firm—Kenyon & Kenyon

[57] ABSTRACT

A brush assembly (2) with a plug housing (3) is inserted into an axial opening of a motor housing (1) so that interference suppression devices (5, 6) can be connected easily from a production point of view and the plug terminals and the brush apparatus can be protected against corrosive media. The plug housing is formed with pockets which hold the interference suppression devices and the plug terminals for easy assembly.

11 Claims, 8 Drawing Figures

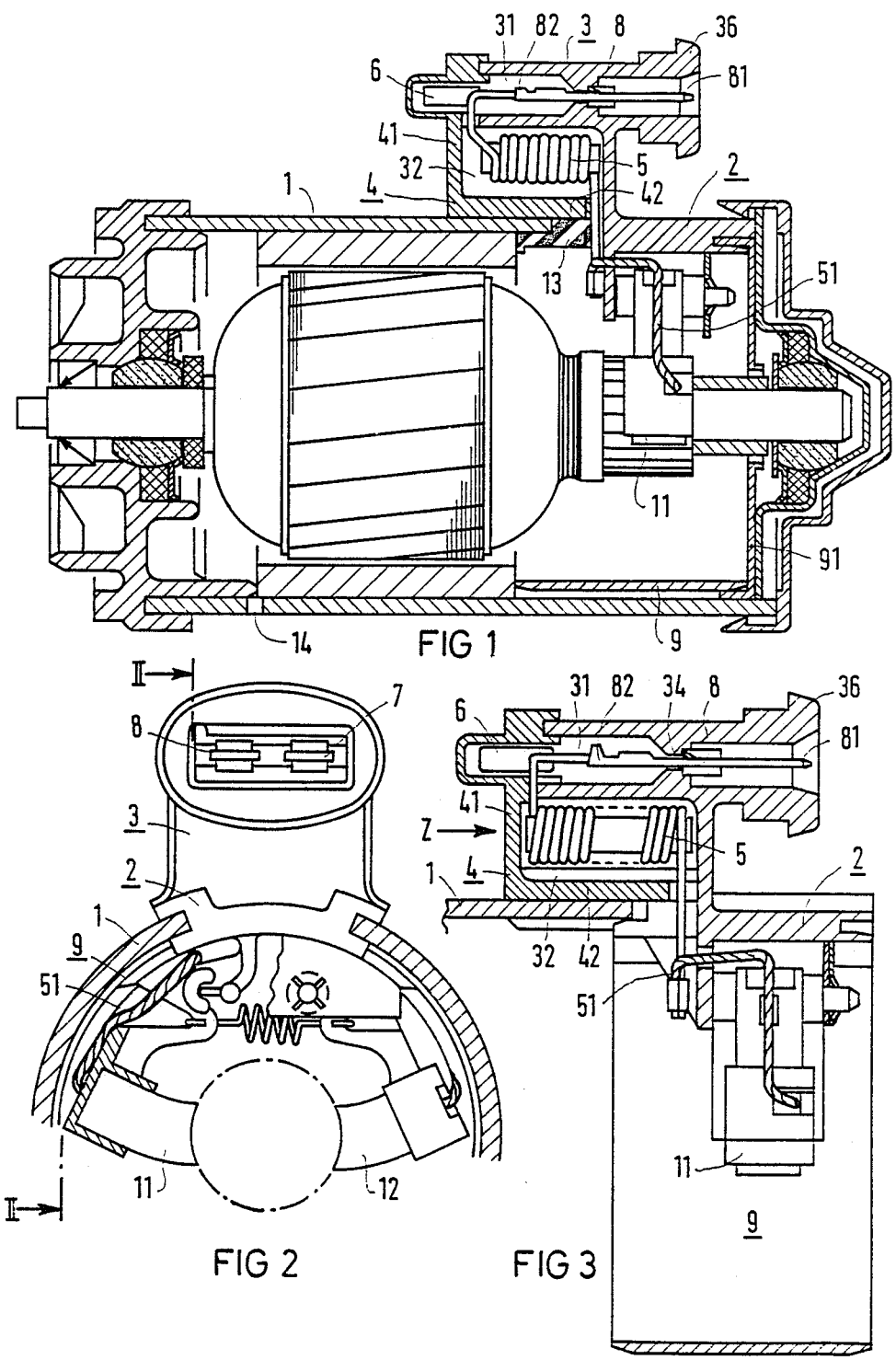

COMMUTATOR MOTOR OF A CLOSED DESIGN WITH AN EXTERNAL ELECTRICAL CONNECTOR HOUSING

BACKGROUND OF THE INVENTION

1. Field of invention

The invention relates to a commutator motor with a housing having a closed design and more particularly to a motor housing which includes interference suppression elements.

2. Description of the prior art

In a known arrangement, disclosed in European Pat. No. 0043460, a connecting plug is cast into a plug housing. The internal terminal ends of the plug protrude into the motor housing and are connected to the carbon brushes. Interference suppression means, if any, are likewise arranged and disposed within the interior of the motor housing.

However the above-described arrangement cannot be used if, for operating reasons or because of the size of the motor, the interference suppression means and the plug contacts must be relocated outside the housing.

SUMMARY OF THE INVENTION

In the present invention, a commutator motor housing is provided which contains connecting plug and interference means and which may be used for oversized motors. A motor housing of a closed design is provided in a manner simple to manufacture. The housing is particularly advantageous for use in automatic production machines and it can assure, especially if used for a pump motor, absolute protection of the interference suppression means, of the electric plug terminals and of the entire brush assembly against vapors or liquids.

The commutator motor housing designed in accordance with the invention permits, in spite of its small overall size, the relocation of the interference suppression means and the plug terminals outside the motor housing. The present arrangement further allows these parts to contact each other and the brushes in a moisture-protected manner. All components to be mounted and contacted in the brush assembly or in the integrally-formed-on plug housing can be supplied in space-saving axial handling direction and in a simple manner.

If, nevertheless, a corrosive medium should penetrate at extraordinary stress points, for instance, at the feed-throughs of the connecting lines to the motor housing, additional protection of the brush assembly is made possible by the provision of a covering sleeve formed adjacent to the brush assembly which extends along the inside wall of the motor housing in the circumferential direction. The sleeve protects the entire brush assembly against moisture from the outside. Optionally an end cap can be attached to the end face of the sleeve as protection against a liquid that might penetrate from the end bell side of the motor. By this measure, moisture is conducted away from the brush assembly and then, if required, discharged through an opening provided at the lowest point of the motor housing without damage to the brush assembly.

BRIEF DESCRIPTION OF THE FIGURES

The invention, as well as further advantageous embodiments of the invention, will be explained in the following with the aid of the drawings wherein:

FIG. 1 shows an axial longitudinal section through a commutator motor housing for a hydraulic system constructed in accordance with the invention;

FIG. 2 shows an end view of a brush assembly with integrally formed plug housing;

FIG. 3 shows a sectional view of the motor housing of FIG. 2 taken along section line II—II;

DETAILED DESCRIPTION OF THE INVENTION

Figure 4:
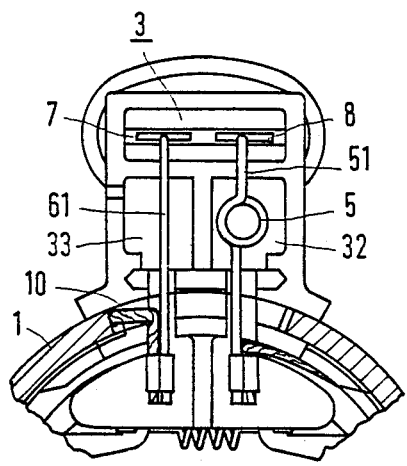
FIG. 4 shows an end view from direction Z of FIG. 3.

FIG. 1 shows an axial longitudinal section of a commutator motor for driving a hydraulic system. In a manner not shown here in detail, but known from the European Patent mentioned above, a brush assembly with an integrally-formed plug housing 3 extending radially outwardly at an opening of the motor housing.

Plug housing 3 (shown in more detail in FIGS. 2 to 5) extends radially outwardly of the motor housing and includes three pockets 31, 32 and 33 which are formed at their left end with a service opening which can be closed by a cover cap 4 in such a manner that terminal plugs 7, 8 and a capacitor 6 can be inserted, for instance, into the pocket 31 an interference suppression choke 5 can be inserted axially into the pocket 32. The pockets have radial wiring openings for installing the supply lines 51, 61 from the inner terminal ends 72, 82 of the plugs 7, 8 to the interference suppression choke 5 or to the carbon brushes 11, 12. As can be seen particularly from FIG. 3, the wiring openings for the connecting lines 51, 61 are disposed at the right ends of the pockets 32, 33 and comprise slots at the service opening of pocket 31 so that the connecting lines 51, 61 can be inserted axially through the slotted wiring openings.

The connecting lines 51, 61 run from inner terminal ends 72, 82 disposed on the left side of pocket 31 through the slotted wiring openings made in wall 38 separating pocket 31 from pockets 32 and 33 as shown in FIGS. 1 and 4. Terminals 7 and 8 extend from pocket 31 through an end wall 37, said end wall being disposed opposite to the service opening.

Figure 5:
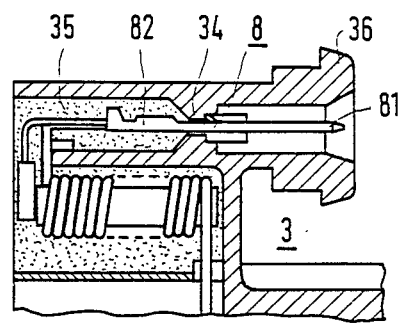
FIG. 5 shows a further embodiment of the arrangement of the invention.
Figure 6:
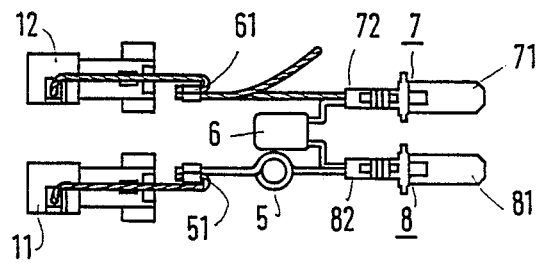
FIG. 6 shows a pre-assembled unit consisting of terminal plugs, interference suppression means and brush holders.

Advantageously it is provided that the terminal plugs 7, 8, the interference suppression means 5, 6 and the brush holders with the carbon brushes 11, 12 can be preassembled as shown in FIG. 6 and then installed with the mutual connecting lines 51, 61 and the capacitor 6 shunted across the terminal plugs 7, 8 into the brush bridge 2 or the plug housing 6 axially through the service openings. The right-hand external terminal ends 71, 81 of the terminal plugs 7, 8 are then pushed through wall parts 34 of the plug housing 3, opposite the service opening. As can be seen particularly from FIGS. 3 and 5, the external terminal ends 71, 81 of the terminal plugs 7, 8 extend into a plug terminal part 36, onto which an external supply line with a plug can be secured.

For a sealing termination of the plug housing 3 after the unassembled elements shown in FIG. 6 have been installed, a one-piece closing cover 4 consisting of a cover part 41 and a strap part 42 (shown in FIG. 3) can be installed. Alternatively the interior of the equipped pockets 31, 32 or 33 can be filled with a casting compound 35 as shown in FIG. 5.

Figure 7:
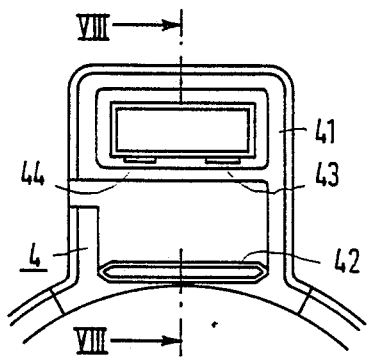
FIG. 7 shows an end view of a cover cap provided for closing the service openings of the commutator housing.
Figure 8:
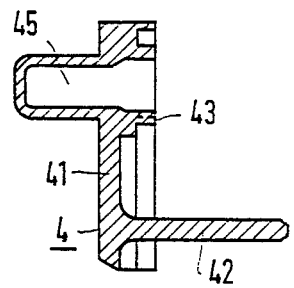
FIG. 8 shows the arrangement of FIG. 7 along line VIII—VIII.

FIGS. 7, 8 show details of cover cap 4 which is provided for closing off the service openings, and the slots forming some of the wire openings. The cover cap 4 consists of a lid 41 which closes the end face the service openings, and a cam part 42 which closes off the wire opening slots.

In the upper part of the lid part 41 of the cover cap 4, a handle projecting toward the outside is formed which advantageously is used at the same time for accommodating the capacitor 6. In order to seal the assembly well with the cover cap 4, ultrasonic welding of the cover cap 4 is provided, according to one embodiment of the invention, at least in the wall region adjacent to the end face of the cover opening of the pocket 31.

As can be seen from FIG. 7, the cover part 41 has thin, axially protruding lips 43, 44 in the vicinity of the connecting lines 51, 61 as these lines are brought through from the pocket 31 into the pockets 32 and 33, respectively. The lips 43, 44 protrude prior to the ultrasonic welding sufficiently so that the connecting wires 51, 61 are pressed against the walls of the pocket 31 or the pockets 32 and 33, but the cover cap 4 cannot yet make contact with its circular rim against the end face of the plug housing 3 in the vicinity of the service opening. During the ultrasonic welding operation, the lips 43, 44 and the opposite wall parts of the housing 3 are softened by the temperature rise and the axial pressure by which the cover cap 4 is pressed against the end face of the plug housing 3, forces these members to flow around the connecting wires 51, 61 forming a seal, while the cover cap 4 reaches its final contact position at the end face of the housing 3.

For forming a seal between the motor housing 1 and the connecting wires 51, 61 brought through the strap part 42 of the cover cap 4 and the motor housing 1, a squeezable seal 13 is interposed according to one embodiment as can be seen from FIG. 1. If moisture should penetrate into the interior of the housing 1, in spite of this, additional protection of the brush apparatus is achieved by a cover sleeve 9 which is integrally formed with the brush assembly 3, and extends radially inwardly through the motor housing 1. The brush assembly can additionally be protected by an end cap 91 which can be disposed at the end face of the motor for protection against moisture on the end bell side. Moisture which may have penetrated can flow off through an opening 14 at the underside of the motor housing 1.

In a production-wise particularly simple manner, an interference suppression ground line 10 (see FIG. 4) which may be necessary for interference suppression, is connected at one end to the connecting line 61 and at another end to the housing 1. Line 10 forms a seal by the provision that it is contacted as a flexible line by clamping between the wall of the motor housing 1 alone in the region of the housing opening on the one hand, and the brush assembly 3 on the other hand, which can be inserted into the opening with a close fit.

What is claimed is:

1. A motor commutator of closed design which can be inserted into an opening of a motor housing comprising:
   (a) a brush assembly (2);
   (b) a plug housing (3) separate from said brush assembly and extending radially outwardly of said motor housing, said housing having at least a first and a second axially extending pocket, (31, 32), said pockets terminating in corresponding first and second axial service openings, said first pocket having an end wall (37) opposite said first service opening, and first and second radial wire openings in communication with said first and second service openings respectively;
   (c) terminal plugs (7, 8), said plugs having inner connecting ends (72, 82) disposed within said first pocket and external terminal ends (71, 81) extending through said end wall for connection to a service line;
   (d) interference means disposed in said second pocket; and
   (e) wiring means disposed in said wire openings for interconnecting said interference means, said terminal plugs and said brushes.

2. The motor commutator of claim 1 further comprising cover cap means for closing said service and wiring openings.

3. The motor commutator according to claim 2 wherein the cover cap means (4) has a first cover part (41) closing the service openings and lip means (42, 43, 44) formed thereon for closing the wire openings.

4. Commutator motor according to claim 3 wherein, in the vicinity of the first wire opening, the wire means are tightly surrounded by fusing the lip means and a wall part of the first pocket (31).

5. Commutator motor according to claim 1 further comprising a seal (13) interposed between the plug housing (3) and the motor housing (1) in the region of the second wire opening.

6. The commutator of claim 1 further comprising a casting material for closing said openings.

7. Commutator motor according to claim 1 further comprising a covering sleeve (9) attached to the brush assembly which extends in the circumferential direction along an inner wall of the motor housing (1) and surrounds the brush assembly.

8. Commutator motor according to claim 1 further comprising a flexible interference suppression ground line (10) connected to said wire means and said brush assembly, said line being clamped between the wall of the motor housing (1) and said plug housing to form a close fit.

9. Commutator motor according to claim 1 wherein the terminal plugs (7, 8) and the interference suppression means are pre-assembled so that they can be inserted through the service opening and the wire opening into the pockets.

10. A motor commutator of closed design which can be inserted into an opening of a motor housing comprising
    (a) a brush assembly (2);
    (b) a plug housing (3) extending radially outwardly of said motor housing, said housing having at least a first and a second axially extending pocket, (31, 32), said pockets terminating in corresponding first and second axial service openings, said first pocket having an end wall (37) opposite said first service opening, and first and second radial wire openings in communication with said first and second service openings respectively;
    (c) terminal plugs (7, 8), said plugs having inner connecting ends (72, 82) disposed within said first pocket and external terminal ends (71, 81) extending through said end wall for connection to a service line;

(d) interference means disposed in said second pocket;

(e) wiring means disposed in said wire openings for interconnecting said interference means said terminal plugs and said brushes; and (f) cover cap (4) means for closing said service and wiring openings, said cover cap means being welded by ultrasound at least in the region of the first pocket, making a seal there with or all sides.

11. A motor commutator of closed design which can be inserted into an opening of a motor housing comprising (a) a brush assembly (2);

(b) a plug housing (3) extending radially outwardly of said motor housing, said housing having at least a first and a second axially extending pocket, (31, 32), said pockets terminating in corresponding first and second axial service openings, said first pocket having an end wall (37) opposite said first service opening, and first and second radial wire openings in communication with said first and second service openings respectively;

(c) terminal plugs (7, 8), said plugs having inner connecting ends (72, 82) disposed within said first pocket and external terminal ends (71, 81) extending through said end wall for connection to a service line;

(d) interference means disposed in said second pocket;

(e) wiring means disposed in said wire openings for interconnecting said interference means said terminal plugs and said brushes;

(f) a covering sleeve (9) attached to the brush assembly which extends in the circumferential direction along an inner wall of the motor housing (1) and surrounds the brush assembly; and (g) an end cap (91) for closing off said covering sleeve.

* * * * *